US008291476B2

(12) United States Patent
Ui et al.

(10) Patent No.: US 8,291,476 B2
(45) Date of Patent: Oct. 16, 2012

(54) IDENTIFIER AUTHENTICATING SYSTEM

(75) Inventors: Takaharu Ui, Tokyo (JP); Toshihide Uotani, Tokyo (JP); Shin Yoshimura, Tokyo (JP); Hiroshi Takada, Tokyo (JP)

(73) Assignees: Japan Registry Services, Co., Ltd., Tokyo (JP); Shin Yoshimura, Tokyo (JP)

( * ) Notice: Subject to any disclaimer, the term of this patent is extended or adjusted under 35 U.S.C. 154(b) by 996 days.

(21) Appl. No.: 12/225,081

(22) PCT Filed: Nov. 30, 2006

(86) PCT No.: PCT/JP2006/323944
§ 371 (c)(1),
(2), (4) Date: Sep. 12, 2008

(87) PCT Pub. No.: WO2007/105341
PCT Pub. Date: Sep. 20, 2007

(65) Prior Publication Data
US 2009/0049538 A1    Feb. 19, 2009

(30) Foreign Application Priority Data
Mar. 14, 2006   (JP) .................................. 2006-069915

(51) Int. Cl.
*H04L 29/06*    (2006.01)
(52) U.S. Cl. ........................................................... 726/4
(58) Field of Classification Search .................. None
See application file for complete search history.

(56) References Cited

U.S. PATENT DOCUMENTS

| | | | | |
|---|---|---|---|---|
| 2002/0073335 | A1* | 6/2002 | Shuster | 713/201 |
| 2004/0194102 | A1* | 9/2004 | Neerdaels | 718/100 |
| 2005/0039045 | A1* | 2/2005 | Wheeler | 713/201 |

FOREIGN PATENT DOCUMENTS

| | | |
|---|---|---|
| JP | 10-238183 | 8/1998 |
| JP | 2004-234059 | 8/2004 |

OTHER PUBLICATIONS

Ykiji Yamauchi, Yoshiki Furuno, "Domain Name Service Settei no Kihon no Saikakunin to Ssaikin no Doko eno Taio o Kangaeru 3 DNS no Shikumi", Open Design vol. 8, No. 11, CQ Publishing Co., Ltd., Nov. 1, 2001, pp. 15 to 16; Fig. 1.3.
Michiko Arai, "DNS no Cache Cache no Yuko Kigen", UNIX Magazin, vol. 20, No. 12, Ascii Corp., Dec. 1, 2005, pp. 71 to 80.
Tetsuya Yokoyama, "Sawatte Wakaru DNS no Kiso Dai 1 Kai DNS towa Donna Shikumi Daro", Nikkei Windows Pro, No. 85, Nikkei Business Publications, Inc., Apr. 1, 2004, pp. 150 to 157.

* cited by examiner

*Primary Examiner* — David Pearson
(74) *Attorney, Agent, or Firm* — Clark & Brody (57) ABSTRACT

There is provided an identifier authenticating system in which information requesting users can share all the predetermined information held in a plurality of information providing servers. In the identifier authentication system, when an identifier holding user 18 presents an identifier to an information requesting server 16, the information requesting server 16 asks a location management server 14 about a location of the information providing server 15, the location management server 14 returns confirmed IP address of the information providing server 15 to the information requesting server 16 based on the location information, and the information requesting server 16 utilizes the confirmed IP address to access the information providing server 15 corresponding to the confirmed IP address, and receives predetermined information corresponding to the presented identifier and a disclosure level from the accessed information providing server 15.

8 Claims, 4 Drawing Sheets

IDENTIFIER AUTHENTICATING SYSTEM

TECHNICAL FIELD

The present invention relates to an identifier authenticating system in which predetermined information held in a plurality of information providing servers can be shared.

BACKGROUND ART

There is an information network system in which an information providing server installed in an information providing company is connected with an information terminal installed for an information requesting user that receives information through a network (see Patent Document 1). The information providing server has information storing means for storing information from an information providing user that provides the information to the information providing server or information from the information requesting user, and information transmitting means for transmitting information. The information terminal has a display unit that displays information provided from the information providing server, and information receiving means for receiving information from the information providing server. In the system, when contents of information held in the information providing server are updated or new information is transmitted to the information providing server from the information providing user, the contents of the information will be displayed at a predetermined position in the display unit of the information terminal. According to this system, updated information or new information can be confirmed by just seeing the display unit of the terminal without operating the information terminal by the information requesting user.
Patent Document 1: Japanese Unexamined Patent Publication (Kokai) No. 1998-238183

DISCLOSURE OF THE INVENTION

Problem to be Solved by the Invention

The information network system disclosed in the patent publication is a proprietary private network and also a closed network set in one region or at one point, and hence any user other than the information requesting users in this network cannot access this network. In this information network system, only the information requesting users in the private network can share information, and any user other than the information requesting users in the private network cannot utilize information held in the information providing server of this network. When a user other than the information requesting users who are currently using this information network system utilizes this system, a network must be newly configured in the private network.

An object of the present invention is to provide an identifier authenticating system in which information requesting users can share all the predetermined information held in a plurality of information providing server.

Means for Solving the Problem

A premise of the present invention for solving the aforementioned problems is achieved by an identifier authenticating system in which an information providing server that holds predetermined information and an information requesting server that requests the information providing server to provide the predetermined information form each of a plurality of independent private networks, and presenting a predetermined identifier to the information requesting server by an identifier holding user having the identifier given from the information providing server enables providing the predetermined information corresponding to the presented identifier to the information requesting server from the information providing server.

The present invention in the premise is characterized in that the identifier authenticating system is provided with a location management server that unifies management of the location information of the information providing servers, a disclosure level of information disclosed to the information requesting server is classified into a first disclosure level to an n-th disclosure level, and the predetermined information corresponding to the identifier and the first to n-th disclosure levels is stored in the information providing server; and when the identifier holding user presents the identifier to the information requesting server, the information requesting server asks the location management server about a location of the information providing server, and the location management server returns confirmed location information of the information providing server to the information requesting server based on the location information, and the information requesting server uses the confirmed location information to access the information providing server corresponding to the confirmed location information, and receives the predetermined information corresponding to the presented identifier and the disclosed level from the accessed information providing server.

As one example of the present invention, the location management server authenticates a disclosure level that should be applied to the information requesting server among the first to n-th disclosure levels, and returns confirmed location information of the information providing server corresponding to the presented identifier and the authenticated disclosure level to the information requesting server.

As another example of the present invention, the information providing server authenticates a disclosure level that should be applied to the information requesting server among the first to n-th disclosure levels, and provides the information requesting server with the predetermined information corresponding to the presented identifier and the authenticated disclosure level.

As another example of the present invention, the location management server is divided into a highest first location management server to a lowest m-th location management server, the first to m-th location management servers and the information providing server form a tree structure which branches into a plurality of paths starting from the first location management server toward the m-th location management server and from the m-th location management server toward the information providing server, and the confirmed location information of the information providing server is registered on any one of the plurality of m-th location management servers; and when the information requesting server asks the first location management server about a location of the information providing server, the first location management server returns confirmed location information of a second location management server immediately lower than that to the information requesting server based on the location information, and when the information requesting server accesses the second location management server corresponding to the returned confirmed location information and asks the accessed second location management server about a location of the information providing server, the second location management server returns confirmed location information of a third location management server immediately lower than that to the information requesting server based on the location information, the information providing server is retrieved by repeating an inquiry and a response between the location management servers and the information requesting server starting from the first location management server toward the m-th location management server in this manner, and the retrieved information providing server provides the information requesting server with predetermined information corresponding to the presented identifier and the disclosure level.

As still another example of the present invention, when the confirmed location information of the location management server and the confirmed location information of the information providing server that have been returned based on the retrieval of location in the past are stored in the information requesting server, the identifier authentication system omits retrieval of the location management servers higher than the location management server that stores the confirmed location information stored in the information requesting server, and when retrieval of the location management servers lower than the location management server immediately lower than the location management server that stores the confirmed location information and the information providing server is needed, it retrieves the information providing server by repeating an inquiry and a response between the location management servers and the information requesting server starting from the location management server immediately lower than the location management server that stores the confirmed location information toward the lower servers, and the retrieved information providing server provides the information requesting server with location information corresponding to the presented identifier and the disclosure level.

As yet still another example of the present invention, storage times of the confirmed location information of the location management server and the confirmed location information of the information providing server that have been returned based on the retrieval of location in the past are set in the information requesting server, and when the storage time elapses, the information requesting server erases the stored confirmed location information of the location management server and confirmed location information of the information providing server.

As yet still another example of the present invention, the information requesting server can arbitrarily erase the confirmed location information of the location management server and the confirmed location information of the information providing server that are stored in the information requesting server and have been returned based on the retrieval of location in the past.

As yet still another example of the present invention, in the identifier authenticating system, a presentation-time when the identifier is presented to the information requesting server is transmitted from the information requesting server to the information providing server, and when the information providing server determines that the presentation-time exceeds a set time, it stops providing predetermined information to the information requesting server.

As yet still another example of the present invention, in the identifier authenticating system, the information providing servers, the information requesting servers, and the location management servers are connected with each other through the Internet, and a series of processes including an inquiry of a location of the information providing server to the location management server, a response of the confirmed location information from the location management server to the information requesting server, a request of predetermined information from the information requesting server to the information providing server, and a provision of predetermined information from the information providing server to the information requesting server are executed through the Internet.

Effect of the Invention

According to the identifier authenticating system in accordance with the present invention, the information requesting users can share all the predetermined information held in each of the information providing servers, and the information requesting users can easily obtain the predetermined information stored in the information providing servers. In the system, the location management server unifies management of the location information of all the information providing servers, and the location management server responds to an inquiry of the confirmed location information of the information providing server, so that the information requesting server can access all the information providing servers, thus allowing the information requesting server to receive the predetermined information from the information providing servers. In the system, since the disclosure level of the information disclosed to the information requesting server is classified into the first disclosure level to the n-th disclosure level, and the predetermined information corresponding to the identifier and the disclosure level is provided from the information providing server to the information requesting server, the information requesting server can receive only the necessary and sufficient information in the predetermined information. Since the system can share all the predetermined information held in a plurality of information providing servers by using it, the information requesting user can receive various identifier authentication services according to the disclosure level of the information, without being limited to specific identifier authentication services. Since the disclosure level of the information is added to the information requesting server aside from the identifier, and various kinds of predetermined information according to each disclosure level are provided from the information providing server, the system is not required to hold a plurality of identifiers in order to receive various kinds of identifier authentication services, and thus various identifier authentication services can be received by one identifier.

In the identifier authenticating system in which the location management server authenticates the disclosure level that should be applied to the information requesting server among the first to n-th disclosure levels, since the location management server first authenticates the information disclosure level of the information requesting server to then retrieve the location of the information providing server, there is an advantage that useless retrieval of the location of the information providing server when the information disclosure level is not authenticated can be omitted, as compared with the case where the information providing server authenticates the information disclosure level of the information requesting server. In this system, the information requesting user can receive various identifier authentication services according to the disclosure level of the information, without being limited to specific identifier authentication services. Moreover, in the system, the disclosure level of the information is added to the information requesting server aside from the identifier, the location management server authenticates the disclosure level that should be applied to the information requesting server, and various kinds of predetermined information corresponding to the identifier and each disclosure level are provided from the information providing server, so that it is not necessary to hold a plurality of identifiers in order to receive various kinds of identifier authentication services, and various identifier authentication services can be received by one identifier.

In the identifier authenticating system in which the information providing server authenticates the disclosure level that should be applied to the information requesting server among the first to n-th disclosure levels, since the location of the information providing server is first retrieved and then the information providing server authenticates the disclosure level of the information requesting server, it is not necessary to set a plurality of locations of the information providing servers in which the predetermined information corresponding to the information disclosure level is stored, for every information disclosure level, as compares with the case where the location management server authenticates the information disclosure level of the information requesting server. According to the system, the information requesting user can receive various identifier authentication services according to the disclosure level of the information, without being limited to specific identifier authentication services. Moreover, according to the system, the disclosure level of the information is added to the information requesting server aside from the identifier, the information providing server authenticates the disclosure level that should be applied to the information requesting server, and various kinds of predetermined information corresponding to the identifier and each disclosure level are provided from the information providing server, so that the system is not required to hold a plurality of identifiers in order to receive various kinds of identifier authentication services, and thus various identifier authentication services can be received by one identifier.

According to the identifier authenticating system in which the information providing server is retrieved by repeating an inquiry and a response between the location management servers and the information requesting server, the location management server is divided into the highest first location management server to the lowest m-th location management server, and a plurality of location management servers hierarchically and decentrally manages the location information of the information providing servers, so that a load on the location management server can be reduced, as compared with the case where single location management server manages the location information of the information providing servers. Even when the location information of many information providing servers is registered on the location management server, this system can avoid the location management server from falling an overload.

In the identifier authenticating system in which retrieval of the location management servers higher than the location management server that stores the confirmed location information stored in the information requesting server is omitted, and when retrieval of the location management servers lower than the location management server that stores the confirmed location information and the information providing server is needed, the information providing server is retrieved by repeating an inquiry and a response between the location management server and the information requesting server starting from the location management server immediately lower than the location management server that stores the confirmed location information toward the lower servers, it is not necessary to repeat the retrieval of the information providing server from the first location management server, thus allowing the information providing servers to be retrieved quickly. Additionally, this system can eliminate a load on the location management servers higher than the location management server that stores the confirmed location information.

In the identifier authenticating system in which when the storage times of the confirmed location information of the location management server and the confirmed location information of the information providing server elapse, the information requesting server erases the stored confirmed location information, even when the information requesting server stores the confirmed location information of the location management server and the information providing server, and then the location information of the location management server and the location information of the information providing server corresponding to those pieces of confirmed location information are changed, the system can be coped with it, thus allowing the location of the information providing server to be retrieved accurately. It is to be noted that when the stored confirmed location information is erased after the predetermined period has elapsed, retrieval of the information providing server is performed by repeating an inquiry and a response between the location management servers and the information requesting server starting from the first location management server toward the m-th location management server.

In the identifier authenticating system which can arbitrarily erase the confirmed location information of the location management server and the confirmed location information of the information providing server which the information requesting server stored, even when the information requesting server stores the confirmed location information of the location management server and the confirmed location information of the information providing server, and then the location information of the location management server and the location information of the information providing server corresponding to those pieces of confirmed location information are changed, the system can be coped with it, thus allowing the location of the information providing server to be retrieved accurately. It is to be noted that when the stored confirmed location information is arbitrarily erased after the predetermined period has elapsed, retrieval of the information providing server is performed by repeating an inquiry and a response between the location management servers and the information requesting server starting from the first location management server toward the m-th location management server.

In the identifier authenticating system in which when the presentation-time of the identifier to the information requesting server exceeds the set time, provision of the predetermined information to the information requesting server is stopped, it can prevent the identifier from unauthorized use by persons other than the identifier holding user, thus allowing to prevent the information on the identifier holding users from fraudulently flowing out.

In the identifier authenticating system in which the information providing servers, the information requesting servers, and the location management servers are connected with each other through the Internet, and a series of processes including an inquiry and a response, and a request and provision of the predetermined information are executed through the Internet, the information requesting users can share the predetermined information held in these information providing servers by utilizing the Internet, and anyone can obtain anywhere easily the predetermined information stored in these information providing servers if there is an Internet connection environment. According to the system, all the predetermined information held in the information providing servers can be shared by utilizing the Internet which is an existing public communication network, so that the information requesting user can receive various identifier authentication services according to the identifier and the disclosure level, without being limited to specific identifier authentication services.

EXPLANATIONS OF LETTERS OR NUMERALS

10: private network
11: private network
12: private network
13: private network
14: location management server
15: information providing server
15A: information providing server
15B: information providing server
16: information requesting server
16A: information requesting server
16B: information requesting server
18: identifier holding user
20: Internet
21: service registry operator
22: IC card
23: IC card

BEST MODE(S) FOR CARRYING OUT THE INVENTION

Figure 1:
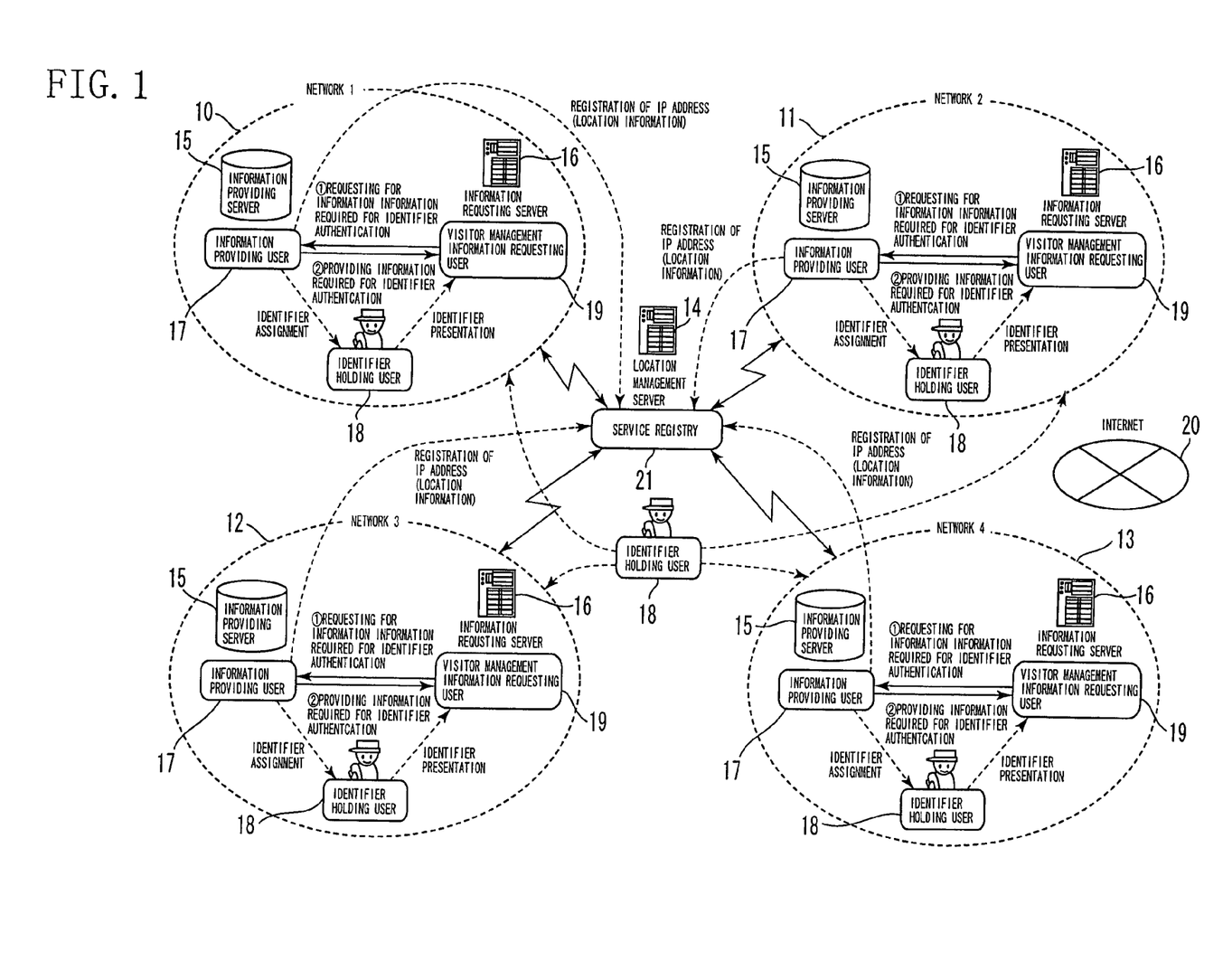
FIG. 1 is a conceptual view of an identifier authenticating system.
Figure 2:
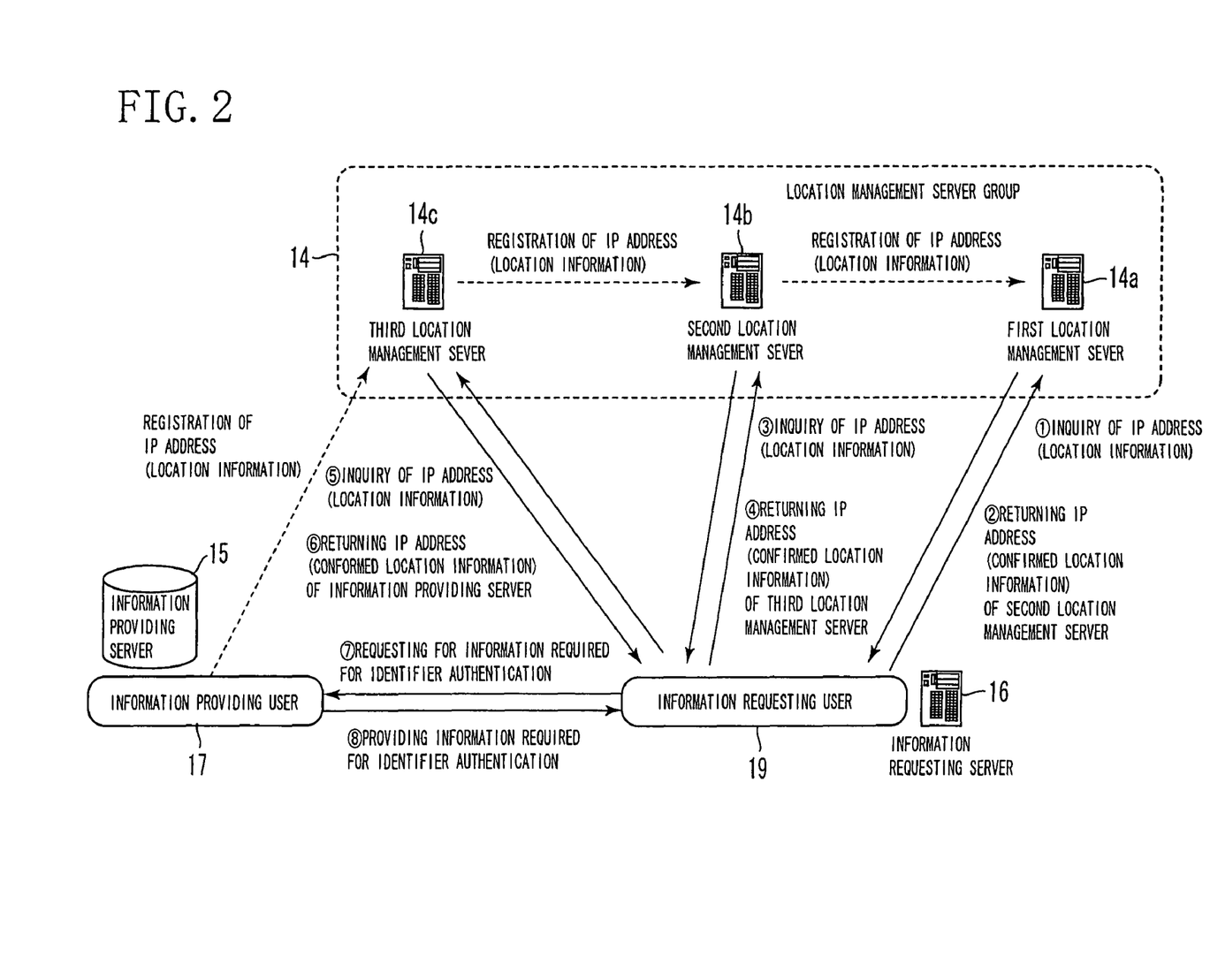
FIG. 2 is view showing one example of a procedure for retrieving a confirmed IP address of an information providing server.

Details of an identifier authenticating system according to the present invention will now be described as follows with reference to the accompanying drawings. FIG. 1 is a conceptual diagram of the identifier authenticating system. FIG. 2 is a view showing an example of a procedure for retrieving a confirmed IP address of an information providing server 15 executed between a location management server 14 and an information requesting server 16. The identifier authenticating system is configured by a plurality of private networks 10, 11, 12, and 13, and a location management server 14 that unifies management of the later-explained information providing servers 15.

Each of the private networks 10, 11, 12, and 13 is formed of the information providing server 15 that holds predetermined information, and the information requesting server 16 that requests the information providing server 15 to provide the predetermined information. The information providing server 15 is managed by an information providing user 17 that provides predetermined information, and gives a predetermined identifier to an identifier holding user 18. The information requesting server 16 is managed by an information requesting user 19 that requests the information providing user 17 to provide the predetermined information. In each of the private networks 10, 11, 12, and 13, when the identifier holding user 18 that has the predetermined identifier provided from the information providing server 15 (information providing user 17) presents the identifier to the information requesting server 16, predetermined information corresponding to the presented identifier is provided to the information requesting server 16 from the information providing server 15. It is to be noted that while one information providing server 15 and one information requesting server 16 are shown in each of the private networks 10, 11, 12, and 13 in FIG. 1, a plurality of information providing servers 15 and a plurality of information requesting servers 16 actually present in each of the private networks 10, 11, and 12 and 13.

Each of the private networks 10, 11, 12, and 13 is a system that grants authority to the identifier holding user 18 when the identifier holding user 18 presents the identifier to the information requesting server 16, and has an Authentication, Authorization, Accounting (AAA) security function.

Each of the private networks 10, 11, 12, and 13 may authenticate (confirm) a specific user to then grant appropriate authority to the authenticated identifier holding user 18 in some cases (management control), and preserves all kinds of records to monitor presence/absence of problems (audit). The authentication examines and determines validity of the identifier holding user 18. Authenticating means, such as an ID number, a password, an IC card, biometrics, or the like can be used for the authentication. The management control grants appropriate authority to the valid identifier holding user 18 according to authority provided with respect to each of the networks. The audit preserves records describing what kind of authority is granted to an identifier and when, and how the authority has been used, thereby making it possible to examine these histories.

As described above, each of these private networks 10, 11, 12, and 13 is a closed network constructed in one region or one site, and thus it cannot provide the information held in the information providing server 15 to any information requesting server 16 other than the information requesting servers 16 of the private network to which it belongs if it remains as it is. In addition, the identifier held by the identifier holding user 18 can be used only within a specific private network. In this system, however, a plurality of information providing servers 15 and a plurality of information requesting servers 16, and the location management server 14 that unifies management of these information providing servers 15 are connected with each other through the Internet 20 as shown in FIG. 1, and an open network is formed of these servers 14, 15, and 16, so that all the information requesting servers 16 can share all the predetermined information held in all the information providing servers 15 in the private networks 10, 11, 12, and 13. Further, any information requesting servers presented the identifier held by the identifier holding user 18 can request the information providing server that holds the predetermined information to provide the information for identifier authentication. Namely, the identifier holding user 18 utilizing this system can deal with all the services within the networks 10, 11, 12 and 13 by one identifier.

The location management server 14 is managed by, for example, an operator that carries out registry business of domain names or an operator (a service registry 21) that manages registration of domain names, or the like. The location management server 14 is a computer having a high-capacity hard disk mounted thereon, and is connectable with the Internet 20. Although not shown, a keyboard, a printer, or a display is connected with the location management server 14 through interfaces. The location management server 14 is formed of a plurality of location management server groups, and these server groups are divided into a highest-level first location management server (a root server) to a lowest-level m-th location management server. The location management servers 14 and the information providing server 15 form a pyramidal structure in which the first location management server is the top of them, and the servers are spread from the first location management server toward the m-th location management server, and further from the m-th location management server toward the information providing server. The location management servers 14 and the information providing server 15 form a tree structure which branches into a plurality of paths from the first location management server toward the m-th location management server, and further from the m-th location management server toward the information providing server. Incidentally, although the drawing is omitted, there are a plurality of first to m-th location management servers. Here, the m-th location management server may be the first location management server or a third location management server in some cases, or may be a fifth location management server or a 10th location management server in some cases.

IP addresses (location information) of the information providing servers are managed hierarchically and decentrally (registered) in these location management servers 14. Namely, a confirmed IP address (confirmed location information) of the information providing server 15 is registered on any one of a plurality of m-th location management servers, and a confirmed IP address (confirmed location information) of the m-th location management server is registered on any one of a plurality of (m−1)th location management servers. In this manner, the confirmed IP addresses (confirmed location information) of the first to m-th location management servers and the information providing server are hierarchically registered on these location management servers 14 so as to track back from the information providing server to the m-th location management server, and further from the m-th location management server to the first location management server. As one example of registering the IP address of the information providing server 15 on the location management server 14, the information providing user 17 transmits an electronic document on which the IP address are written to the location management server 14 of a service registry operator 21 through the Internet 20 (electronic registration). Alternatively, the registration is performed by presenting a document on which the IP address is written to the service registry operator 21 that manages the location management server 14 (document registration).

The information requesting server 16 is a computer mounting a high-capacity hard disk thereon, and is connectable with the Internet 20. Although not shown, a keyboard, a printer, or a display is connected with the information requesting server 16 through interfaces. In this system, a disclosure level of information disclosed to the information requesting server 16 (information requesting user 19) is classified into a first disclosure level to an n-th disclosure level. Here, the disclosure level changes with a range of the predetermined information and a type of the predetermined information provided to the information requesting server 16. For example, when a certain information requesting server 16 authenticates a certain person, the disclosure level differs depending on how far information of the person to be authenticated is required and is sufficient. Specifically, the disclosure level of the information to the information requesting server 16 differs depending on that all the information of a working company name, a belonging department, a full name, a staff number, and a facial photo of a person to be authenticated by the information requesting server 16 is set as necessary and sufficient information, only confidential information (a full name, a staff number, a facial photo) in the information is set as the necessary and sufficient information, or only disclosable information (a working company name, a belonging department) in the information is set as the necessary and sufficient information. As described above, classifying the disclosure level of the information to the information requesting server 16 into the first to n-th disclosure levels makes it possible to provide the necessary and sufficient information to each information requesting server 16, allowing preventing unnecessary and insufficient information from being provided.

The information providing server 15 is a computer mounting a high-capacity hard disk thereon, and is connectable with the Internet 20. Although not shown, a keyboard, a printer, or a display is connected with the information providing server 15 through interfaces. Predetermined information corresponding to the identifier and the first to n-th disclosure levels is stored in the information providing server 15. Hereinafter, the information of the first to n-th disclosure levels will be specifically described. When a certain information requesting server 16 authenticates a certain person, and when information of the person to be authenticated is a working company name, a belonging department, a full name, a staff number, and a facial photo, information of the first disclosure level includes all of the company name, the belonging department, the full name, the staff number, and the facial photo, and information of the second disclosure level includes the belonging department, the full name, the staff number, and the facial photo excluding the company name, for example.

Further, information of the third disclosure level includes the full name, the staff number, and the facial photo, excluding the company name and the belonging department, and information of the fourth disclosure level includes only the facial photo excluding the company name, the belonging department, the full name, and the staff number. It is to be noted that since the identifier given to the identifier holding user 18 from the information providing server 15 (information providing user 17) is corresponded to the first to n-th disclosure levels, all authentication can be performed by one identifier.

When the identifier holding user 18 presents the identifier to the information requesting server 16, the information requesting server 16 asks the location management server 14 about a location of the information providing server 15. The location management server 14 returns a confirmed IP address (confirmed location information) of the information providing server 15 to the information requesting server 16. The information requesting server 16 uses the confirmed IP address returned from the location management server 14 to access the information providing server 15 corresponding to the confirmed IP address, and requests the information providing server 15 to provide predetermined information for identifier authentication. The information requesting server 16 receives predetermined information corresponding to the presented identifier and the disclosure level from the information providing server 15.

One example of a retrieval procedure of the information providing server 15 when the information requesting server 16 asks the location management server 14 about a location of the information providing server 15 will be described as follows based on FIG. 2. The third location management server 15C shall be the m-th location management server in the description of this retrieval procedure. Incidentally, the location management servers 14B and 14C have registered their IP addresses on the location management servers 14A and 14B that are immediately higher than those, respectively. The location management servers 14B and 14C are managed by the immediately higher location management servers 14A and 14B based on the registered IP addresses, respectively. The higher level location management servers manage only the IP address of the location management server immediately lower than those, but do not manage the IP addresses of the location management servers other than and lower than the location management server immediately lower than those, respectively.

The location management servers 14A, 14B, and 14C, the information providing server 15, and the information requesting server 16 are connected with the Internet 20. When the identifier holding user 18 presents the identifier to the information requesting server 16, the information requesting server 16 asks the first location management server 14A about a location of the information providing server 15. The first location management server 14A retrieves a confirmed IP address (confirmed location information) of the second location management server 14B, and returns a retrieved IP address of the second location management server 14B to the information requesting server 16. The retrieved second location management server 14B among a plurality of second location management servers which lie in a tree structure from the first location management server 14A is connected with the third location management server 14C (m-th location management server) that stores the confirmed IP address (confirmed location information of the information providing server 15) of the information providing server 15.

When the confirmed IP address of the second location management server 14B is returned to the information requesting server 16, the information requesting server 16 accesses the second location management server 14B based on the IP address to ask the accessed second location management server 14B about a location of the information providing server 15. The second location management server 14B retrieves a confirmed IP address (confirmed location information) of the third location management server 14C, and returns a retrieved IP address of the third location management server 14C to the information requesting server 16. When the confirmed IP address of the third location management server 14C is returned to the information requesting server 16, the information requesting server 16 accesses the third location management server 14C based on the IP address to ask the accessed third location management server 14C about a location of the information providing server 15. The third location management server 14C retrieves a confirmed IP address (confirmed location information) of the information providing server 15, and returns a retrieved IP address of the information providing server 15 to the information requesting server 16. When the confirmed IP address of the information providing server 15 is returned to the information requesting server 16, the information requesting server 16 accesses the information providing server 15 having that IP address, and requests the accessed information providing server 15 to provide predetermined information corresponding to the identifier and the disclosure level.

It is to be noted that authentication of the disclosure level that should be applied to the information requesting server 16 may be performed by the location management server 14, or by the information providing server 15. The information providing server 15 provides the information requesting server 16 with the predetermined information corresponding to the identifier and the disclosure level, and the information requesting server 16 receives the predetermined information from the information providing server 15. As described above, the information providing server 15 is retrieved by repeating an inquiry and a response between the location management servers 14A, 14B, and 14C, and the information requesting server 16 starting from the first location management server 14A toward the third location management server 14C (m-th location management server), and the information requesting server 16 which has received the response of the confirmed IP address of the information providing server 15 requests the accessed information providing server 15 to provide the predetermined information corresponding to the identifier and the disclosure level.

It is to be noted that a series of processes including the inquiry of the location of the information providing server 15 to the first location management server 14A, the response of the IP address of the second location management server 14B from the first location management server 14A to the information requesting server 16, the inquiry of the location of the information providing server 15 to the second location management server 14B, the response of the IP address of the third location management server 14C from the second location management server 14B to the information requesting server 16, the inquiry of the location of the information providing server 15 to the third location management server 14C, the response of the confirmed IP address of the information providing server 15 from the third location management server 14C to the information requesting server 16, the request of the predetermined information from the information requesting server 16 to the information providing server 15, and the provision of the predetermined information from the information providing server 15 to the information requesting server 16 are executed through the Internet 20.

The information requesting server 16 stores the confirmed IP address of the location management server 14 that has been returned based on the retrieval of location in the past, and also stores the confirmed IP address of the information providing server 15 that has been returned based on the retrieval of location in the past. When the confirmed IP addresses of the location management server 14 and the information providing server 15 are stored in the information requesting server 16, retrieval of location management servers higher than the location management server that stores the confirmed IP address stored in the information requesting server 16 among those location management servers 14A, 14B, and 14C is omitted. Meanwhile, when retrieval of location management servers lower than the location management server that stores the confirmed IP address, and the information providing server 15 is needed, the information providing server 15 is retrieved by repeating an inquiry and a response between the location management server 14 and the information requesting server 16 starting from the location management server immediately lower than the location management server that stores the confirmed IP address toward the lower location management servers, and the retrieved information providing server 15 provides the information requesting server 16 with the predetermined information corresponding to the presented identifier and disclosure level.

For example, when the confirmed IP address of the information providing server 15 that has been returned based on the retrieval of location in the past is registered on the specific third location management server 14C and the information requesting server 16 stores that confirmed IP address, the information providing server 15 is immediately requested to provide the predetermined information based on the confirmed IP address of the information providing server 15 stored in the information requesting server 16, without repeating an inquiry and a response between the location management server 14 and the information requesting servers 16 starting from the first location management server 14A toward the third location management server 14C.

Meanwhile, when the confirmed IP address of the second location management server 14B that has been returned based on the retrieval of location in the past is registered on the specific first location management server 14A, and the information requesting server 16 stores that confirmed IP address, the location management server 14B is requested to return the confirmed IP address of the information providing server 15 based on the confirmed IP address of the second location management server 14B stored in the information requesting server 16, without repeating an inquiry and a response between the first location management server 14A and the information requesting servers 16. In this case, retrieval of the IP address of the third location management server 14C lower than the confirmed IP address registered on the second location management server 14B is required, so that the information providing server 15 is retrieved by repeating an inquiry and a response between the location management servers 14B and 14C, and the information requesting server 16 starting from the second location management server 14C immediately lower than the first location management server 14A toward the lower servers, and the retrieved information providing server 15 provides the information requesting server 16 with the predetermined information corresponding to the presented identifier and disclosure level.

Storage times of the confirmed IP address of the location management server 14 and the confirmed IP address of the information providing server 15 that have been returned based on the retrieval of location in the past are set in the information requesting server 16. It is preferable for the storage time to be set every several days, several weeks, or several months. Incidentally, it can be set to zero second. When the storage time elapses, the information requesting server 16 erases the confirmed IP address of the location management server 14 and the confirmed IP address of the information providing server 15 stored therein. It is to be noted that when the confirmed IP address is erased, and thereafter the identifier corresponding to the erased confirmed IP address is presented to the information requesting server 16, retrieval of the information providing server 15 is started from the first location management server. Namely, the information providing server 15 is retrieved by repeating an inquiry and a response between the location management server 14 and the information requesting servers 16 starting from the first location management server toward the m-th location management server, and the retrieved information providing server 15 provides the information requesting server 16 with the predetermined information corresponding to the presented identifier and disclosure level.

The information requesting server 16 can arbitrarily erase the confirmed IP address of the location management server 14 and the confirmed IP address of the information providing server 15 that are stored therein and have been returned based on the retrieval of location in the past. As one example for it, when a predetermined time elapses after storing the confirmed IP address, the information requesting server 16 determines whether or not the confirmed IP address of the location management server 14 or the information providing server 15 is changed. In this case, the information requesting server 16 uses the confirmed IP address to access the location management server 14 or the information providing server 15 corresponding to the IP address, but when the access is invalid, it determines that the confirmed IP address has been changed to then erase the stored IP addresses. Note herein that when the confirmed IP address is arbitrarily erased, and thereafter an identifier corresponding to the erased confirmed IP address is presented to the information requesting server 16, retrieval of the information providing server 15 is started from the first location management server.

Namely, the information providing server 15 is retrieved by repeating an inquiry and a response between the location management server 14 and the information requesting servers 16 starting from the first location management server toward the n-th location management server, and the retrieved information providing server 15 provides the information requesting server 16 with the predetermined information corresponding to the presented identifier and disclosure level.

The information requesting server 16 counts a presentation-time that an identifier is presented to the information requesting server 16, and transmits the counted presentation-time to the information providing server 15. When the presentation-time of the identifier exceeds a set time, the information providing server 15 stops providing the predetermined information to the information requesting server 16. The set time is preset in the information providing server 15, and it is preferably within 1 minute, and more preferably within 10 seconds.

Figure 3:
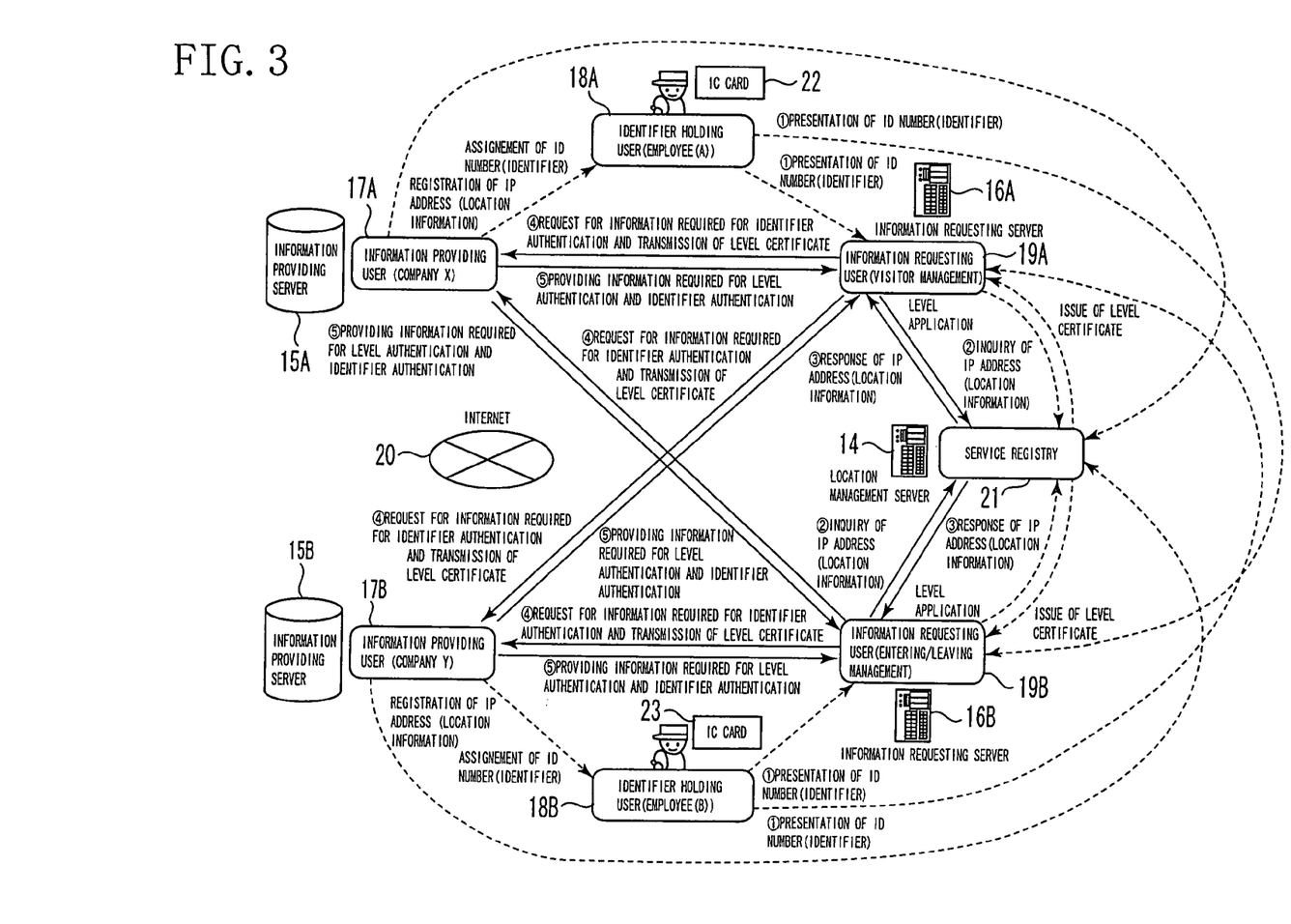
FIG. 3 is a block diagram of the identifier authenticating system shown as one example.

FIG. 3 is a block diagram of the identifier authenticating system shown as one example. In the system shown in FIG. 3, each of the servers 14, 15A, 15B, 16A, and 16B are connected to the Internet 20. In FIG. 3, the system will be described using visitor management in a business partner company for managing business card information of an employee(A) 18A (identifier holding user) of a company X and an employee(B) 18B (identifier holding user) of a company Y who are visitors to the company, based on predetermined information provided by information providing servers 15A and 15B, and entering/leaving management for permitting entering/leaving of the employee(A) 18A in the company X and permitting entering/leaving of the employee(B) 18B in the company Y based on the predetermined information provided by information providing servers 15A and 15B, as an example. The employee(A) 18A is an employee of the company X, and the employee(B) 18B is an employee of the company Y. The company X lends an IC card 22 to the employee(A) 18A, and the company Y lends an IC card 23 to the employee(B) 18B. The predetermined ID numbers (identifiers) are stored in these IC cards 22 and 23.

In the system shown in FIG. 3, a disclosure level of information disclosed to the information requesting servers 16A and 16B (information requesting users 19A and 19B) which is one of the identification information is classified into a first disclosure level to a second disclosure level. However, the disclosure level of the information to the information requesting servers 16A and 16B is not limited to the first to second disclosure levels, but the disclosure level may be classified into the first to third or more disclosure levels (first to n-th disclosure levels) if the number of services becomes three or more other than the visitor management and the entering/leaving management. Here, the disclosure level of the information to the information requesting servers 16A and 16B changes with service contents carried out by the information requesting users 19A and 19B, and a range of the predetermined information and a type of the predetermined information presented to the information requesting servers 16A and 16B further change with the disclosure level. Although, a plurality of ID numbers (identifiers) corresponding to these services have been needed for every service content to be carried out so far, predetermined information to be provided can be selected for every service to be carried out by utilizing the disclosure level, thus allowing various types of authentication corresponding to a plurality of services to be achieved only by giving one ID number (identifier) to the identifier holding users 18A and 18B.

In the system shown in FIG. 3, the location management server 14 (service registry operator 21) determines the disclosure level of the information to the information requesting servers 16A and 16B in advance (pre-registration system). Further, the information providing servers 15A and 15B authenticate the disclosure level of the information to the information requesting servers 16A and 16B based on level certificates issued to the information requesting users 16A and 16B (information providing server authentic method). In a pre-registration system, the information requesting users 19A and 19B apply for own user information and required service contents with the service registry operator 21, and the service registry operator 21 determines the disclosure level of the information to the information requesting servers 16A and 16B based on the applied information, and issues the level certificate proving the determined disclosure level to the information requesting users 19A and 19B. The application of the disclosure level to the service registry operator 21 is made by an electronic application or a written application.

Specifically, the information requesting users 19A and 19B submit applications on which a company name, a type of industry, a purpose of use, and the like are written to the service registry operator 21. Further, the information requesting users 19A and 19B submit documents proving being general companies which can request visitor's business card information, and the information requesting users 19A and 19B submit documents proving being building management companies which employ the entering/leaving management system for the information on the entering/leaving management. When the applications and those documents are submitted, the service registry operator 21 examines contents of the applications and documents to thereby determine the disclosure level of the information to the information requesting servers 16A and 16B. When the disclosure level of the information to the information requesting servers 16A and 16B is determined, the service registry operator 21 issues the level certificate (electronic certificate) indicating the determined disclosure level to the information requesting users 19A and 19B. Predetermined information corresponding to ID numbers (identifiers) of the employee(A) and the employee(B), and the disclosure level of the information to the information requesting servers 16A and 16B are stored in the information providing servers 15A and 15B. Incidentally, the disclosure level of the information to the information requesting server 16A in the visitor management is the first disclosure level, and the information on the first disclosure level includes a company name, a belonging department, a full name, an address of the company, and a contact in the company. The disclosure level of the information to the information requesting server 16B in the entering/leaving management is the second disclosure level, and the information on the second disclosure level includes a company name and a staff number.

In the case of visiting the business partner company, a person in charge of the business partner company (information requesting user 19A) confirms what types of persons the employee(A) 18A of the company X and the employee(B) 18B of the company Y are. The information providing server 15A is installed in the company X (information providing user 17A) where the employee(A) 18A works, and the information providing server 15B is installed in the company Y (information providing user 17B) where the employee(B) 18B works. The information requesting server 16A is installed in the business partner company. The location management server 14 is installed in a business office of the service registry operator 21. The confirmed IP addresses (confirmed location information) of the information providing servers 15A and 15B are registered on the location management server 14. The employee(A) 18A and the employee (B) 18B who visit the business partner company present the IC cards 22 and 23 having a business card function to an IC card reader/writer (not shown) installed in the business partner company. When the employee(A) 18A and the employee (B) 18B present the IC cards 22 and 23 to the IC card reader/writer, the ID numbers stored in the IC cards 22 and 23 are read, and the ID numbers are transmitted from the reader/writer to the information requesting server 16A in the business partner company.

The ID number is divided into several hierarchical portions, and each divided hierarchical portion corresponds to one of the IP address of each location management server 14, the IP addresses of the information providing servers 15A and 15B, and the identification information for specifying the predetermined information. In the information providing server authentic method, the highest ID number in the ID number corresponds to the IP address of the second location management server, and the lowest ID number therein corresponds to the identification information for specifying the predetermined information, for example. Further, respective middle ID numbers between the highest ID number and the lowest ID number correspond to the IP addresses of each location management server and the information providing servers 15A and 15B. It is to be noted that the predetermined information is specified by the lowest ID number (identification information of the companies X and Y, and the employee (A) 18A and the employee(B) 18B), and the disclosure level.

When the IC card 22 is presented, the information requesting server 16A in the business partner company asks the location management server 14 about a location of the information providing server 15A installed in the company X. In the system, an inquiry and a response are repeated between the location management server 14 and the information requesting server 16A starting from the first location management server toward the m-th location management server, and a confirmed IP address (confirmed location information) of the information providing server 15A in the company X corresponding to the presented ID number is retrieved. The m-th location management server returns a confirmed IP address of the information providing server 15A to the information requesting server 16A. The information requesting server 16A accesses the information providing server 15A using the returned confirmed IP address, and also transmits the level certificate to the information providing server 15A to thereby request the information providing server 15A to provide the predetermined information on the employee(A). The information providing server 15A authenticates a disclosure level of the information to the information requesting server 16A as the first disclosure level based on the level certificate to the request of the information requesting server 16A, and transmits the predetermined information (authentication of the company X and the employee(A) 18A, the company name, the belonging department, the full name, the address of the company, the contact in the company) corresponding to the ID number and the first disclosure level to the information requesting server 16A. The person in charge of the business partner company can grasp that the visiting employee(A) 18A is an employee of the company X and what kind of person he/she is based on the transmitted predetermined information (business card information).

Meanwhile, when the IC card 23 is presented, the information requesting server 16A in the business partner company asks the location management server 14 about a location of the information providing server 15B installed in the company Y. In the system, an inquiry and a response are repeated between the location management server 14 and the information requesting server 16A starting from the first location management server toward the m-th location management server, and a confirmed IP address (confirmed location information) of the information providing server 15B in the company Y corresponding to the presented ID number is retrieved. The m-th location management server returns a confirmed IP address of the information providing server 15B to the information requesting server 16A. The information requesting server 16A accesses the information providing server 15B using the returned confirmed IP address, and also transmits the level certificate to the information providing server 15B to thereby request the information providing server 15B to provide the predetermined information on the employee(B) 18B.

For the request of the information requesting server 16A, the information providing server 15B authenticates a disclosure level of the information to the information requesting server 16A as the first disclosure level based on the level certificate, and transmits the predetermined information (authentication of the company Y and the employee(B) 18B, the company name, the belonging department, the full name, the address of the company, the contact in the company) corresponding to the ID number and the first disclosure level to the information requesting server 16A. The person in charge of the business partner company can grasp that the visiting employee(B) 18B is an employee of the company Y and what kind of person he/she is based on the transmitted predetermined information (business card information).

In the entering/leaving management to the companies X and Y (information providing users 17A and 17B) the entering/leaving management system (not shown) employed by the building management company (information requesting user) confirms whether or not entering/leaving the companies X and Y is possible based on the IC cards 22 and 23 that the employee(A) 18A and the employee(B) 18B have. The predetermined information is specified by the lowest ID number (identification information of the companies X and Y, and the employee(A) 18A and the employee(B) 18B) and the disclosure level, also in this case. The information providing server 15A is installed in the company X (information providing user 17A) where the employee(A) 18A works, and the information providing server 15B is installed in the company Y (information providing user) where the employee(B) 18B works. The information requesting server 16B is installed in the management company.

The information requesting server 16B is connected with the entering/leaving management system. The location management server 14 is installed in the business office of the service registry operator 21.

The confirmed IP addresses (confirmed location information) of the information providing servers 15A and 15B are registered on the location management server 14. When the employee(A) 18A and the employee(B) 18B come to the offices and enter the companies X and Y, the employee(A) 18A and the employee(B) 18B present the IC cards 22 and 23 having an employee ID card function to IC card readers/writers (not shown) installed near the doors.

When the employee(A) 18A and the employee(B) 18B present the IC cards 22 and 23 to the IC card readers/writers, the ID numbers stored in the IC cards 22 and 23 are read, and the ID numbers are transmitted to the information requesting server 16B in the management company from the readers/writers.

When the IC card 22 is presented, the information requesting server 16B in the management company asks the location management server 14 about a location of the information providing server 15A installed in the company X. In the system, an inquiry and a response are repeated between the location management server 14 and the information requesting servers 16B starting from the first location management server toward the m-th location management server, and a confirmed IP address (confirmed location information) of the information providing server 15A in the company X corresponding to the presented ID number is retrieved. The m-th location management server returns a confirmed IP address of the information providing server 15A to the information requesting server 16B. The information requesting server 16B accesses the information providing server 15A using the returned confirmed IP address, and also transmits the level certificate to the information providing server 15A to thereby request the information providing server 15A to provide the predetermined information on the employee(A) 18A.

For the request of the information requesting server 16B, the information providing server 15A authenticates a disclosure level of the information to the information requesting server 16B as the second disclosure level based on the level certificate, and transmits the predetermined information (information that the IC card that the employee(A) 18A has is valid, and whether or not the employee(A) 18A can enter/leave the company X based on the information on the second disclosure level (the company name, the staff number of the employee(A) 18A) corresponding to the ID number and the second disclosure level to the information requesting server 16B. When the entering/leaving management system determines that the employee(A) 18A can enter the company X based on the predetermined information received by the information requesting server 16B, it turns off power to an electric lock to thereby release a door lock. Conversely, when it determines that the employee(A) 18A cannot enter the company X based on the predetermined information received by the information requesting server 16B, it keeps the door unlocked without turning off the power to the electric lock.

When the IC card 23 is presented, the information requesting server 16B in the management company asks the location management server 14 about a location of the information providing server 15B installed in the company Y. In the system, an inquiry and a response are repeated between the location management server 14 and the information requesting servers 16B starting from the first location management server toward the m-th location management server, and a confirmed IP address (confirmed location information) of the information providing server 15B in the company Y corresponding to the presented ID number is retrieved. The m-th location management server returns a confirmed IP address of the information providing server 15B to the information requesting server 16B. The information requesting server 16B accesses the information providing server 15B using the returned confirmed IP address, and also transmits the level certificate to the information providing server 15B to thereby request the information providing server 15B to provide the predetermined information on the employee(B) 18B.

For the request of the information requesting server 16B, the information providing server 15B authenticates a disclosure level of the information to the information requesting server 16B as the second disclosure level based on the level certificate, and transmits the predetermined information (information that the IC card that the employee(B) 18B has is valid, and whether or not the employee(B) 18B can enter/leave the company Y based on the information on the second disclosure level (the company name, the staff number of the employee(B) 18B) corresponding to the ID number and the second disclosure level to the information requesting server 16B. When the entering/leaving management system determines that the employee(B) 18B can enter the company Y based on the predetermined information received by the information requesting server 16B, it turns off power to an electric lock to thereby release a door lock. Conversely, when it determines that the employee(B) 18B cannot enter the company Y based on the predetermined information received by the information requesting server 16B, it keeps the door unlocked without turning off the power to the electric lock.

Figure 4:
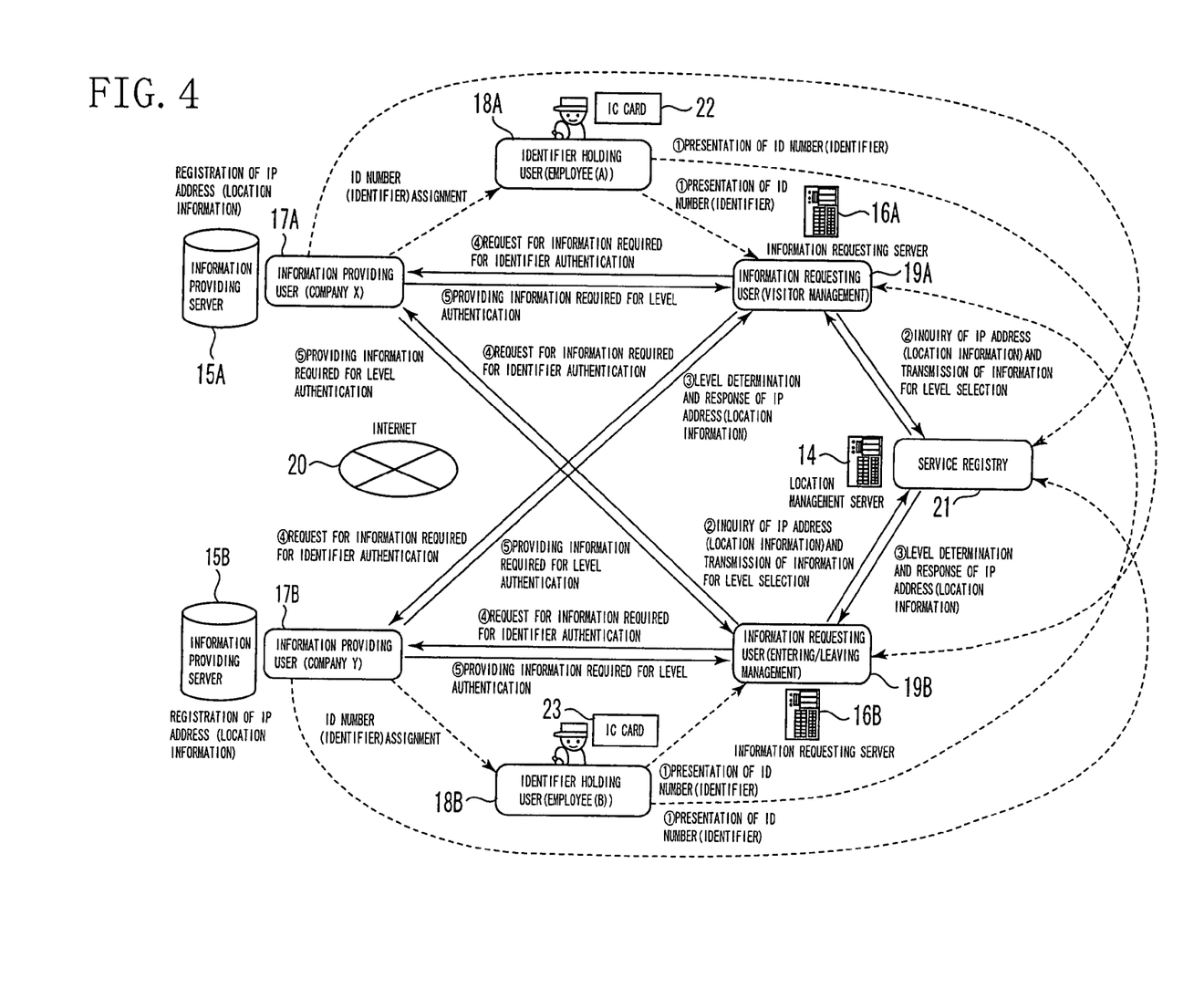
FIG. 4 is a block diagram of the identifier authenticating system shown as another example.

FIG. 4 is a block diagram of an identifier authenticating system shown as another example. In the system shown in FIG. 4, each of the servers 14, 15A, 15B, 16A, and 16B is connected with the Internet 20. In FIG. 4, the system will be described using visitor management in a business partner company for managing business card information of the employee(A) 18A (identifier holding user) of the company X and the employee(B) 18B (identifier holding user) of the company Y who are visitors to the company, based on the predetermined information provided by the information providing servers 15A and 15B, and entering/leaving management for permitting entering/leaving of the employee(A) 18A in the company X and permitting entering/leaving of the employee(B) 18B in the company Y based on the predetermined information provided by the information providing servers 15A and 15B, as an example. The employee(A) 18A is an employee of the company X and the employee(B) 18B is an employee of the company Y. The company X lends the IC card 22 to the employee(A) 18A, and the company Y lends the IC card 23 to the employee(B) 18B. The predetermined ID numbers are stored in these IC cards 22 and 23.

In the system shown in FIG. 4, a disclosure level of the information to the information requesting servers 16A and 16B (information requesting users 19A and 19B) is classified into a first disclosure level and a second disclosure level.

In the system shown in FIG. 4, the location management server 14 (service registry operator 21) determines the disclosure level of the information to the information requesting servers 16A and 16B (information requesting users 19A and 19B) in real time (real-time system). Further, the location management server 14 authenticates a disclosure level of the information to the information requesting servers 16A and 16B (location management server authentic method). The information requesting servers 16A and 16B select a corresponding item from type of industry, purpose of use, service contents, and the like in question items disclosed by the service registry operator 21 when asking locations of the information providing servers 15A and 15B, and transmits the selected question item information to the first location management server that is the highest in the location management servers 14. The first location management server determines in real time the disclosure level of the information to the information requesting servers 16A and 16B which have asked about the location, based on the transmitted question item information. The predetermined information corresponding to the ID number and the disclosure level is stored in the information providing servers 15A and 15B. It is to be noted that the disclosure level of the information to the information requesting servers 16A and 16B in the visitor management is the first disclosure level, and the information on the first disclosure level includes a company name, a belonging department, a full name, an address of the company, and a contact in the company. The disclosure level of the information to the information requesting servers 16A and 16B in the entering/leaving management is the second disclosure level, and the information on the second disclosure level includes a company name and a staff number.

In the case of visiting a business partner company, a person in charge of the business partner company (information requesting user 19A) confirms what types of persons the employee(A) 18A of the company X and the employee(B) 18B of the company Y are. The information providing server 15A is installed in the company X (information providing user 17A) where the employee(A) 18A works, and the information providing server 15B is installed in the company Y (information providing user 17B) where the employee(B) 18B works. The information requesting server 16A is installed in the business partner company. The location management server 14 is installed in the business office of the service registry operator 21. The confirmed IP address corresponding to the first disclosure level of the information providing servers 15A and 15B (confirmed location information) and the confirmed IP address (confirmed location information) corresponding to the second disclosure level of the information providing servers 15A and 15B are registered on the location management server 14.

The employee(A) 18A who visits the business partner company presents the IC card 22 having a business card function to an IC card reader/writer (not shown) installed in the business partner company. When the employee(A) 18A presents the IC card 22 to the IC card reader/writer, the ID number stored in the IC card 22 is read, and the ID number is transmitted from the reader/writer to the information requesting server 16A in the business partner company. The ID number is divided into several hierarchical portions, and each divided hierarchical portion corresponds to one of the IP address of each location management server 14, the IP address of the information providing server 15A, and the identification information for specifying the predetermined information.

In the location management server authentic method, the disclosure level of the information corresponds to the IP address of the second location management server, the highest ID number in the ID number corresponds to the IP address of the third location management server, and the lowest ID number therein corresponds to the identification information for specifying the predetermined information, for example. Further, respective middle ID numbers between the highest ID number and the lowest ID number correspond to the IP addresses of each location management server and the information providing servers 15A and 15B. It is to be noted that the predetermined information is specified by the lowest ID number (identification information of the companies X and Y, and the employee(A) 18A and the employee(B) 18B). When the IC card 22 is presented, the information requesting server 16A in the business partner company asks the location management server 14 about a location of the information providing server 15A installed in the company X. At this time, the selected question item information is transmitted from the information requesting server 16A to the first location management server.

The first location management server immediately determines and authenticates a disclosure level of the information to the information requesting server 16A as the first disclosure level based on the question item information transmitted from the information requesting server 16A, and returns an IP address (confirmed location information) of the second location management server corresponding to the first disclosure level. In the system, an inquiry and a response are repeated between the location management server 14 and the information requesting server 16A starting from the second location management server toward the m-th location management server, and a confirmed IP address (confirmed location information) of the information providing server 15A corresponding to the presented ID number is retrieved. The m-th location management server returns a confirmed IP address of the information providing server 15A corresponding to the presented ID number to the information requesting server 16A. The information requesting server 16A accesses the information providing server 15A using the returned confirmed IP address, and requests the information providing server 15A to provide the predetermined information corresponding to the presented ID number. In response to the request from the information requesting server 16A, the information providing server 15A transmits the predetermined information (authentication of the company X and the employee(A) 18A, the company name, the belonging department, the full name, the address of the company, the contact in the company) corresponding to the presented ID number, to the information requesting server 16A. The person in charge of the business partner company can grasp that the visiting employee(A) 18A is an employee of the company X and what kind of person he/she is based on the transmitted predetermined information (business card information).

The employee(B) 18B who visits the business partner company present the IC card 23 having a business card function to an IC card reader/writer (not shown) installed in the business partner company. When the employee(B) 18B presents the IC card 23 to the IC card reader/writer, the ID number stored in the IC card 23 is read, and the ID number is transmitted from the reader/writer to the information requesting server 16A in the business partner company. The ID number is divided into several hierarchical portions, and each divided hierarchical portion corresponds to one of the IP address of each location management server 14, the IP address of the information providing server 15B, and the identification information for specifying the predetermined information. When the IC card 23 is presented, the information requesting server 16A in the business partner company asks the location management server 14 about a location of the information providing server 15B installed in the company Y. At this time, the selected question item information is transmitted from the information requesting server 16A to the first location management server.

The first location management server immediately determines and authenticates a disclosure level of the information to the information requesting server 16A as the first disclosure level based on the question item information transmitted from the information requesting server 16A, and returns an IP address (confirmed location information) of the second location management server corresponding to the first disclosure level. In the system, an inquiry and a response are repeated between the location management server 14 and the information requesting server 16A starting from the second location management server toward the m-th location management server, and a confirmed IP address (confirmed location information) of the information providing server 15B corresponding to the presented ID number is retrieved. The m-th location management server returns a confirmed IP address of the information providing server 15B corresponding to the presented ID number to the information requesting server 16A. The information requesting server 16A accesses the information providing server 15B using the returned confirmed IP address, and requests the information providing server 15B to provide the predetermined information corresponding to the presented ID number. In response to the request from the information requesting server 16A, the information providing server 15B transmits the predetermined information (authentication of the company Y and the employee(B) 18B, the company name, the belonging department, the full name, the address of the company, the contact in the company) corresponding to the presented ID number, to the information requesting server 16A. The person in charge of the business partner company can grasp that the visiting employee(B) 18B is an employee of the company Y and what kind of person he/she is based on the transmitted predetermined information (business card information).

In the entering/leaving management to the companies X and Y (information providing users), the entering/leaving management system (not shown) employed by the building management company (information requesting user 19B) confirms whether or not entering/leaving the companies X and Y is possible based on the IC cards 22 and 23 that the employee(A) 18A and the employee(B) 18B have. The predetermined information is specified by the lowest ID number (identification information of the companies X and Y, and the employee(A) 18A and the employee(B) 18B), also in this case. The information providing server 15A is installed in the company X (information providing user 17A) where the employee(A) 18A works, and the information providing server 15B is installed in the company Y (information providing user 17B) where the employee(B) 18B works. The information requesting server 16B is installed in the management company. The information requesting server 16B is connected with the entering/leaving management system. The location management server 14 is installed in the business office of the service registry operator 21. The confirmed IP addresses (confirmed location information) of the information providing servers 15A and 15B are registered on the location management server 14. The location management server 14 determines and authenticates in real time the disclosure level of the information to the information requesting server 16B which has asked about the location, based on the transmitted question item information.

When the employee(A) 18A comes to and enters the company X, the employee(A) 18A presents the IC card 22 having an employee ID card function to an IC card reader/writer (not shown) installed near the door. When the employee(A) 18A presents the IC card 22 to the IC card reader/writer, the ID number stored in the IC card 22 is read, and the ID number is transmitted from the reader/writer to the information requesting server 16B in the management company. When the IC card 22 is presented, the information requesting server 16B in the management company asks the location management server 14 about a location of the information providing server 15A installed in the company X. At this time, the selected question item is transmitted from the information requesting server 16B to the first location management server. The first location management server immediately determines and authenticates a disclosure level of the information to the information requesting server 16B as the second disclosure level based on the transmitted question item information, and returns an IP address (confirmed location information) of the second location management server corresponding to the second disclosure level. In the system, an inquiry and a response are repeated between the location management server 14 and the information requesting servers 16B starting from the second location management server toward the m-th location management server, and a confirmed IP address (confirmed location information) of the information providing server 15A in the company X corresponding to the presented ID number is retrieved. The m-th location management server returns a confirmed IP address of the information providing server 15A corresponding to the presented ID number to the information requesting server. The information requesting server 16B accesses the information providing server 15A using the returned confirmed IP address, and requests the information providing server 15A to provide the predetermined information corresponding to the presented ID number.

In response to the request of the information requesting server 16B, the information providing server 15A transmits the predetermined information (information that the IC card 22 that the employee(A) 18A has is valid, and whether or not the employee(A) 18A can enter/leave the company X based on the information on the second disclosure level (the company name, the staff number of the employee(A) 18A) corresponding to the presented ID number to the information requesting server 16B. When the entering/leaving management system determines that the employee(A) 18A can enter the company X based on the predetermined information received by the information requesting server 16B, it turns off power to an electric lock to thereby release a door lock. Conversely, when it determines that the employee(A) 18A cannot enter the company X based on the predetermined information received by the information requesting server 16B, it keeps the door unlocked without turning off the power to the electric lock.

When the employee(B) 18B comes to and enters the company Y, the employee(B) 18B presents the IC card 23 having an employee ID card function to an IC card reader/writer (not shown) installed near the door. When the employee(B) 18B presents the IC card 23 to the IC card reader/writer, the ID number stored in the IC card 23 is read, and the ID number is transmitted from the reader/writer to the information requesting server 16B in the management company. When the IC card 23 is presented, the information requesting server 16B in the management company asks the location management server 14 about a location of the information providing server 15B installed in the company Y. At this time, the selected question item is transmitted from the information requesting server 16B to the first location management server. The first location management server immediately determines and authenticates a disclosure level of the information to the information requesting server 16B as the second disclosure level based on the transmitted question item information, and returns an IP address (confirmed location information) of the second location management server corresponding to the second disclosure level. In the system, an inquiry and a response are repeated between the location management server 14 and the information requesting servers 16B starting from the second location management server toward the m-th location management server, and a confirmed IP address (confirmed location information) of the information providing server 15B in the company Y corresponding to the presented ID number is retrieved. The m-th location management server returns a confirmed IP address of the information providing server 15B corresponding to the presented ID number to the information requesting server 16B. The information requesting server 16B accesses the information providing server 15B using the returned confirmed IP address, and requests the information providing server 15B to provide the predetermined information corresponding to the presented ID number.

In response to the request of the information requesting server 16B, the information providing server 15B transmits the predetermined information (information that the IC card 23 that the employee(B) 18B has is valid, and whether or not the employee(B) 18B can enter/leave the company Y based on the information on the second disclosure level (the company name, the staff number of the employee(B) 18B) corresponding to the presented ID number to the information requesting server 16B. When the entering/leaving management system determines that the employee(B) 18B can enter the company Y based on the predetermined information received by the information requesting server 16B, it turns off power to an electric lock to thereby release a door lock. Conversely, when it determines that the employee(B) 18B cannot enter the company Y based on the predetermined information received by the information requesting server 16B, it keeps the door unlocked without turning off the power to the electric lock.

In the systems shown in FIG. 3 and FIG. 4, the information requesting servers 16A and 16B in the business partner company or the building management company count a reading time of the ID number (presentation-time of identifier) after the IC cards 22 and 23 are presented to the IC card reader/writer, and transmits the counted reading time to the information providing servers 15A and 15B. The information providing servers 15A and 15B compare the set time that is set in advance with the received reading time, and if the reading time exceeds the set time, it stops transmission of the predetermined information to the information requesting servers 16A and 16B.

The information requesting servers 16A and 16B in the business partner company or the building management company store the confirmed IP address of the location management server 14, and also store the confirmed IP addresses of the information providing servers 15A and 15B corresponding to the ID number, retrieval of the location management servers higher than the location management server that stores the confirmed IP address stored in the information requesting servers 16A and 16B is omitted. Meanwhile, when retrieval of the location management servers lower than the location management server immediately lower than the location management server that stores the confirmed IP address and the information providing server is needed, the information providing servers 15A and 15B are retrieved by repeating an inquiry and a response between the location management server 14, and the information requesting servers 16A and 16B starting from the location management server immediately lower than the location management server that stores the confirmed IP address toward the lower servers.

The storage times of the confirmed IP address of the location management server 14 and the confirmed IP address of the information providing servers 15A and 15B are set to the information requesting servers 16A and 16B in the business partner company or the building management company. When the storage time elapses, the information requesting servers 16A and 16B erase the stored confirmed IP address of the location management server 14 and the confirmed IP addresses of the information providing servers 15A and 15B. In addition, the information requesting server 16A (information requesting user 19A) in the business partner company, and the information requesting server 16B (information requesting user 19B) in the building management company can arbitrarily erase the confirmed IP address of the location management server 14 and the confirmed IP addresses of the information providing servers 15A and 15B stored in the information requesting servers 16A and 16B.

According to the systems shown in the drawings, the information requesting servers 16A and 16B can share all the predetermined information held in each of the information providing servers 15A and 15B, and the information requesting users 19A and 19B can easily obtain the predetermined information stored in the information providing servers 15A and 15B. According to the systems, the location management server 14 unifies management of the location information of the information providing servers 15A and 15B, and the location management server 14 responds to an inquiry about the confirmed IP addresses of the information providing servers 15A and 15B, so that the information requesting servers 16A and 16B can access all the information providing servers 15A and 15B, and the information requesting servers 16A and 16B can receive the predetermined information from the information providing servers 15A and 15B. According to the systems, since the predetermined information is specified by the ID number (identifier) and the disclosure level, and the specified predetermined information is provided to the information requesting servers 16A and 16B, the information requesting servers 16A and 16B can receive only the necessary and sufficient information in the predetermined information. According to the systems, the predetermined information can be changed freely and arbitrarily by utilizing the disclosure level, and various identifier authentication services can be received by this one system without being limited to specific identifier authentication services. According to the systems, since various kinds of predetermined information according to the disclosure level are provided from the information providing servers 15A and 15B, only one ID number (identifier) is required although a plurality of ID numbers have been needed for every service so far, and various identifier authentication services can be received by one ID number.

According to the systems, since the location management server 14, the information providing servers 15A and 15B, and the information requesting servers 16A and 16B are connected with each other through the Internet 20, and a series of processes including the inquiry of the confirmed IP address, the response of the confirmed IP address, the determination and authentication of the level, and the request and provision of the predetermined information are executed through the Internet 20, the information requesting servers 16A and 16B (information requesting users 19A and 19B) can share the predetermined information held in the information providing servers 15A and 15B by utilizing the Internet 20, so that anyone can obtain anywhere easily the authorization information stored in the information providing servers 15A and 15B if there is an Internet connection environment. According to the systems, all the predetermined information held in the information providing servers 15A and 15B can be shared by utilizing the Internet 20 which is an existing public communication network, and thus the information requesting users 19A and 19B can receive various identifier authentication services without being limited to specific identifier authentication services.

According to the systems, since the location management server 14 is divided into the highest first location management server to the lowest m-th location management server, and a plurality of location management servers 14 decentrally manage the IP addresses of the information providing servers 15A and 15B, a load on the location management server 14 can be reduced as compared with the case where single location management server manages the IP addresses of the information providing servers 15A and 15B. According to the systems, retrieval of the location management servers higher than the location management server that stores the confirmed IP address stored in the information requesting servers 16A and 16B is omitted, and the information providing servers 15A and 15B are retrieved by repeating an inquiry and a response between the location management server 14, and the information requesting servers 16A and 16B starting from the location management server immediately lower than the location management server that stores the confirmed IP address toward the lower servers, so that it is not necessary to repeat the retrieval of the information providing servers 15A and 15B from the first location management server, thus allowing the information providing servers 15A and 15B to be retrieved quickly.

According to the systems, the information requesting servers 16A and 16B erase the confirmed IP addresses stored therein when the storing time of the confirmed IP address has elapsed, so that even when the information requesting servers 16A and 16B store the confirmed IP addresses, and thereafter the IP addresses of the location management server 14 and the information providing servers 15A and 15B corresponding to those confirmed IP addresses are changed, the systems can be coped with it, thus allowing the locations of the information providing servers 15A and 15B to be retrieved accurately. Moreover, according to the systems, the information requesting servers 16A and 16B (information requesting users 19A and 19B) can arbitrarily erase the confirmed IP address stored therein, so that even when the servers 16A and 16B store the confirmed IP addresses, and thereafter the IP addresses of the location management server 14 and the information providing servers 15A and 15B corresponding to those confirmed IP addresses are changed, the systems can be coped with it, thus allowing the locations of the information providing servers 15A and 15B to be retrieved accurately. Since the systems stop providing the predetermined information to the information requesting servers 16A and 16B when the presentation-time of the ID number (identifier) to the information requesting servers 16A and 16B exceeds the set time, it can prevent the ID number from unauthorized use by persons other than the identifier holding users 18A and 18B, thus allowing to prevent the information on the identifier holding users 18A and 18B from fraudulently flowing out In the identifier authenticating systems shown in FIG. 3 and FIG. 4, a case of performing the authentication of a visitor in the business partner company and a case of performing authentication of an entering/leaving person in entering/leaving are illustrated, but the systems can deal with services other than those two services, and the number of services to be dealt with is not limited to two services but three or more services can be dealt with. Moreover, although the pre-registration system and the information providing server authentic method are employed in the system shown in FIG. 3, and the real-time system and the location management server authentic method are employed in the system shown in FIG. 4, the pre-registration system and the location management server authentic method may also be employed, and the real-time system and the information providing server authentic method may be employed, either.

The invention claimed is:

1. An identifier authenticating system in which an information providing server that holds predetermined information and an information requesting server that requests the information providing server to provide the predetermined information from each of a plurality of independent private networks, and presenting a predetermined identifier to the information requesting server by an identifier holding user having the predetermined identifier given from the information providing server enables providing the predetermined information corresponding to the presented identifier to the information requesting server from the information providing server, wherein the system comprises a location management server that unifies management of location information of the information providing servers, the location management server is a computer with a hard disk and internet connection and is divided into a highest first location management server to a lowest m-th location management server, the first to m-th location management servers and the information providing server form a tree structure which branches into a plurality of paths from the first location management server to the m-th location management server and from the m-th location management server toward the information providing server, and the confirmed location information of the information providing server is registered on any one of a plurality of the m-th location management servers, a disclosure level of information disclosed to the information requesting server is classified into a first disclosure level to an n-th disclosure level, and the predetermined information corresponding to the identifier and the first to n-th disclosure levels is stored in the information providing server, in the system, when the identifier holding user presents the identifier to the information requesting server, the information requesting server asks the first location management server about a location of the information providing server, and the first location management server returns confirmed location information of a second location management server immediately lower than that to the information requesting server on the location information, and when the information requesting server accesses the second location management server corresponding to the returned confirmed location information and asks the accessed second location management server about a location of the information providing server, the second location management server returns confirmed location information of a third location management server immediately lower than that to the information requesting server based on the location information, the information providing server is retrieved by repeating an inquiry and a response between the location management servers and the information requesting server starting from the first location management server toward the m-th location management server in this manner, and the retrieved information providing server provides the information requesting server with predetermined information corresponding to the presented identifier and the disclosure level, and the information requesting server receives the predetermined information corresponding to the presented identifier and the disclosed level from the accessed information providing server.

2. The identifier authenticating system according to claim 1, wherein the first to the m-th location management server authenticates a disclosure level that should be applied to the information requesting server among the first to n-th disclosure levels, and returns confirmed location information of the information providing server corresponding to the presented identifier and the authenticated disclosure level to the information requesting server.

3. The identifier authenticating system according to claim 1, wherein the information providing server authenticates a disclosure level that should be applied to the information requesting server among the first to n-th disclosure levels, and provides the information requesting server with the predetermined information corresponding to the presented identifier and the authenticated disclosure level.

4. The identifier authenticating system according to claim 1, wherein when the confirmed location information of the first to the m-th location management server and the confirmed location information of the information providing server that have been returned based on the retrieval of location in the past are stored in the information requesting server, the identifier authentication system omits retrieval of the location management servers higher than the first to the m-th location management server that stores the confirmed location information stored in the information requesting server, and when retrieval of the location management servers lower than the location management server immediately lower than the first to the m-th location management server that stores the confirmed location information and the information providing server is needed, it retrieves the information providing server by repeating an inquiry and a response between the first to the m-th location management server and the information requesting server starting from the location management server immediately lower than the first to the m-th location management server that stores the confirmed location information toward the lower servers, and the retrieved information providing server provides the information requesting server with location information corresponding to the presented identifier and the disclosure level.

5. The identifier authenticating system according to claim 4, wherein storage times of the confirmed location information of the first to the m-th location management server and the confirmed location information of the information providing server that have been returned based on the retrieval of location in the past are set in the information requesting server, and when the storage time elapses, the information requesting server erases the stored confirmed location information of the first to the m-th location management server and confirmed location information of the information providing server.

6. The identifier authenticating system according to claim 4, wherein the information requesting server can arbitrarily erase the confirmed location information of the first to the m-th location management server and the confirmed location information of the information providing server which are stored in the information requesting server and have been returned based on the retrieval of location in the past.

7. The identifier authenticating system according to claim 1, wherein, in the identifier authentication system, a presentation-time when the identifier is presented to the information requesting server is transmitted from the information requesting server to the information providing server, and when the information providing server determines that the presentation-time exceeds a set time, it stops providing the predetermined information to the information requesting server.

8. The identifier authenticating system according to claim 1, wherein, in the identifier authentication system, the information providing servers, the information requesting servers, and the first to the m-th location management servers are connected with each other through the Internet, and a series of processes including an inquiry of a location of the information providing server to the first to the m-th location management server, a response of the confirmed location information from the first to the m-th location management server to the information requesting server, a request of predetermined information from the information requesting server to the information providing server, and a provision of predetermined information from the information providing server to the information requesting server are executed through the Internet.

* * * * *